United States Patent [19]
Cummins

[11] Patent Number: 5,591,472
[45] Date of Patent: Jan. 7, 1997

[54] DOUGH CUT-OFF METHOD AND APPARATUS

[75] Inventor: Donald L. Cummins, deceased, late of Mechanicsville, Va., by Marian G. Cummins, executor

[73] Assignee: Cummins Eagle, Inc., Ashland, Va.

[21] Appl. No.: 516,170

[22] Filed: Aug. 17, 1995

Related U.S. Application Data

[63] Continuation-in-part of Ser. No. 297,123, Aug. 29, 1994, Pat. No. 5,443,854.

[51] Int. Cl.$^6$ .................... A21D 6/00; A23P 1/00
[52] U.S. Cl. .................. 425/503; 425/311; 425/382 R; 425/382.4; 426/516
[58] Field of Search .................... 426/503, 516, 426/518; 425/308, 382 R, 382.4, 311

[56] References Cited

U.S. PATENT DOCUMENTS

| | | | |
|---|---|---|---|
| 3,646,894 | 3/1972 | Hasten et al. | 426/503 |
| 4,332,538 | 6/1982 | Campbell | 425/311 |
| 4,424,236 | 1/1984 | Campbell | 426/231 |
| 4,449,908 | 5/1984 | Campbell | 425/204 |
| 4,517,212 | 5/1985 | Campbell | 426/503 |
| 4,948,611 | 8/1990 | Cummins | 426/503 |
| 4,960,601 | 10/1990 | Cummins | 426/504 |
| 5,046,940 | 9/1991 | Cummins | 425/311 |

Primary Examiner—George Yeung
Attorney, Agent, or Firm—Norman B. Rainer

[57] ABSTRACT

Bakery dough continuously emergent from a dough-handling machine is cut into successive pieces of uniform weight by apparatus which involves a nozzle containing a downwardly directed extrusion orifice having a shape that is oblong about a line of elongation. A taut cutting wire aligned in a direction parallel to the line of elongation is caused to move in a reciprocating manner across the orifice in a path that is transverse to the line of elongation.

10 Claims, 2 Drawing Sheets

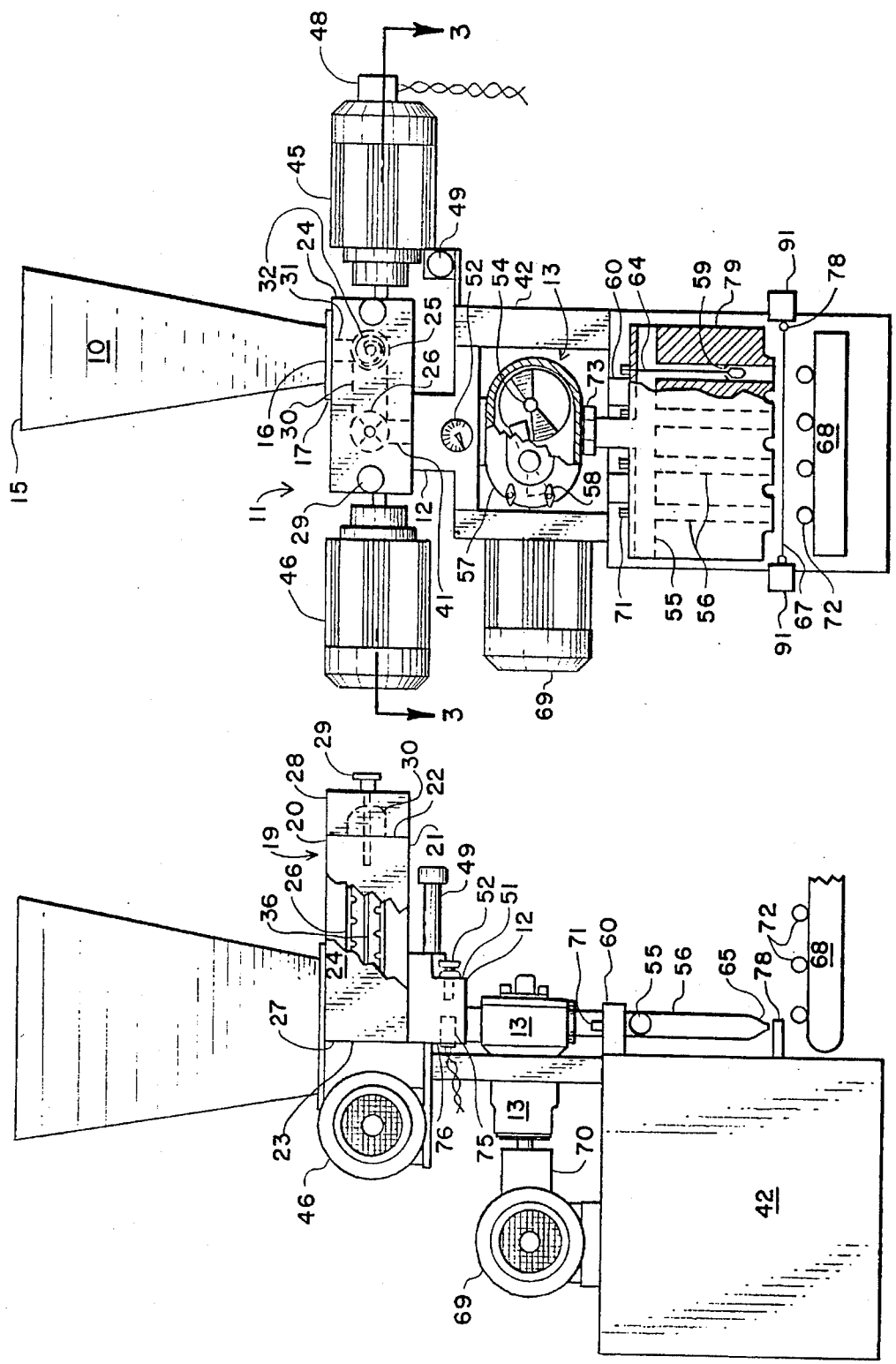

DOUGH CUT-OFF METHOD AND APPARATUS

RELATED APPLICATIONS

This Application is a continuation-in-part of U.S. patent application Ser. No. 08/297,123, filed Aug. 29, 1994, now U.S. Pat. No. 5,443,854.

BACKGROUND OF THE INVENTION

1. Field of the Invention

This invention relates to the handling of dough for baking, and more particularly concerns a method and apparatus for dispensing successive pieces of dough of constant weight.

2. Description of the Prior Art

Methods and apparatus for pumping, homogenizing and dividing dough into pieces of predetermined uniform weight for baking into bread loaves, buns, rolls and the like are disclosed in U.S. Pat. No. 4,960,601; 4,517,212; 4,449,908; 4,424,236; 4,332,538; 4,948,611; and 5,046,940. In general, such apparatus includes a hopper which receives dough, auger means for advancing the dough, metering means which control the advance of the dough, multiple nozzles which receive the metered dough, and cutting means which sever the continuously advancing dough into discrete pieces that fall onto an underlying moving belt.

It is important that the successive dough pieces be of constant weight because bread, buns and rolls are sold on a weight basis. The uniformity of weight also produces products of uniform quality and facilitates the automated handling and packaging of the baked products. The weight of the dough is one of the most expensive cost elements in manufacturing baked goods, and control of the weight tolerances can reduce the need for excess dough. The production of dough pieces of a given weight is known as "scaling" in the trade. In general, less than 2% deviation in weight is sought relative to a target weight.

Modern dough processing equipment operates at high speeds wherein the linear rate of dough extruded through the nozzles may be as high as about 75 feet/minute. The rate of cutting of the stream of dough into discrete pieces may be in the range of 100 to 150 cuts/minute. Since the cutting means acts in a direction transverse to the direction of dough flow, it must move rapidly and with high precision. If the rate of movement of the cutting means is slow relative to the linear rate of movement of the extruded dough, the severed pieces of dough will be of improper shape, or may be fragmented. A problem often encountered at the site of cutting is the accumulation of dough which diminishes the accuracy of the cutting step.

U.S. Pat. Nos. 4,948,611 and 5,046,940 disclose cutting means comprised of an elongated knife which scrapes a vertically disposed flat exit face having circular orifices therein for emergence of the extruded dough. The knife cuts only on the down-stroke, and is driven by a complex four-bar link mechanism which causes the knife to push the severed piece of dough forwardly before it returns again to its uppermost position. The mass of the blade imposes considerable wear upon the mechanism which drives the blade in its complex path of movement. Also, the relatively large surface area of the blade permits attachment of dough which randomly dislodges onto dough pieces, thereby producing over weight pieces.

Cutter devices known as guillotine cutters are well known for the high speed cutting of continuously advancing substrates. Such devices employ a blade that reciprocates transversely to the direction of movement of the substrate and severs the substrate as it emerges from an interactive anvil or holding member.

It is accordingly an object of the present invention to provide means for cutting a rapidly extruded stream of dough into uniform discrete pieces.

It is another object of this invention to provide cutting means as in the foregoing object having improved accuracy or performance.

It is a further object of the present invention to provide cutting means of the aforesaid nature of simple, durable construction amenable to low cost manufacture.

It is yet another object of this invention to provide a method for cutting a rapidly extruded stream of dough into uniform discrete pieces.

These objects and other objects and advantages of the invention will be apparent from the following description.

SUMMARY OF THE INVENTION

The above and other beneficial objects and advantages are accomplished in accordance with the present invention by cut-off apparatus comprising:

a) nozzle means comprising a sidewall surroundingly defining an internal channel and extending upon a center axis between an upper rim extremity and a lower constriction surface having a downwardly directed extrusion orifice centered therein, said orifice having a perimeter configuration that is oblong about a line of elongation, which may also be an axis of symmetry, said constriction surface being tapered at least in portion downwardly and inwardly from said side wall to said orifice, b) a taut cutting wire aligned in a direction parallel to said center line of symmetry and adapted to move in a reciprocating manner across said orifice in a path transverse to said center line of symmetry and in sliding contact with the tapered portion of said constriction surface, and c) means for moving said wire in said prescribed manner.

In a preferred embodiment, the oblong configuration of the orifice is oval-shaped, defined by two long straight parallel edges and opposed short edges that are rounded convexly outwardly. The nature of the tapering of the constriction surface may be straight or rounded. The angle of convergence of the tapered portion of the constriction surface adjacent the long edges of said orifice is a feature of critical importance. Said angle, measured between the constriction surface and the plane of said orifice perimeter is preferably between 4 and 8 degrees.

The method of the present invention comprises moving a taut cutting wire in reciprocating manner transversely back and forth across the orifice of the aforesaid nozzle means in wiping contact with the tapered portion of said constriction surface, the number of traversals of said wire across said rim being between 100 and 150 per minute, and the linear rate of movement of said wire being between 0.3 and 0.6 feet/second.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a front view of a dough handling device employing the cut-off apparatus of the present invention.

FIG. 2 is a side view of the device of FIG. 1.

DESCRIPTION OF THE PREFERRED EMBODIMENT

Figure 3:
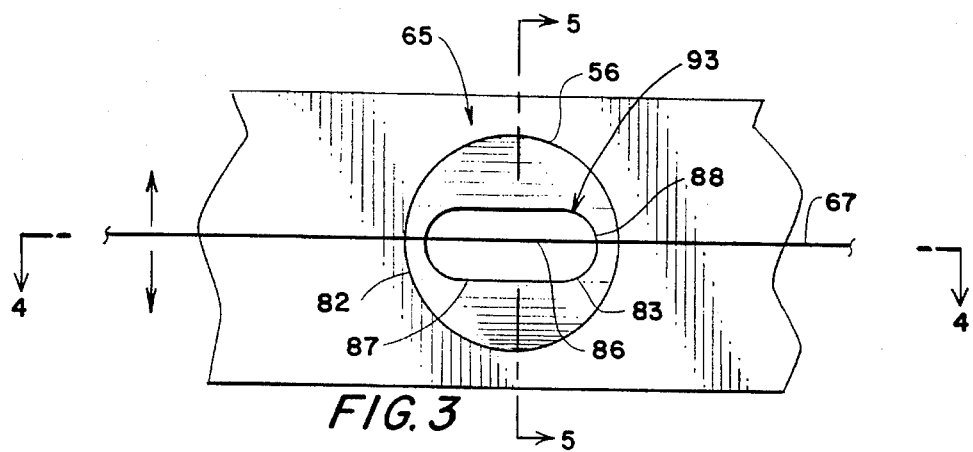
FIG. 3 is an enlarged fragmentary bottom view of the device of FIG. 1.
Figure 4:
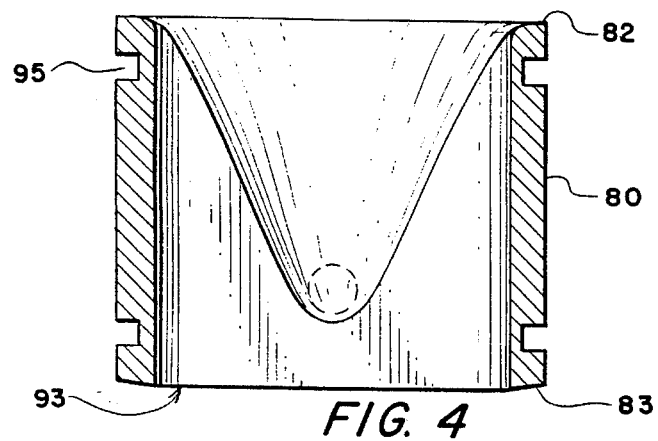
FIG. 4 is an enlarged sectional side view of the nozzle component of the apparatus taken in the direction of the arrows upon line 4—4 of FIG. 3.

Referring to FIGS. 1–2, an embodiment of dough treating and dispensing apparatus which may typically utilize the cut-off apparatus of the present invention is shown comprised of hopper 10 disposed above advancing assembly 11 which is positioned above transition housing 12, metering pump 13 and extrusion conduits 56. An outer framework 42 provides support for said components.

Hopper 10 is of integral construction and tapered downwardly from upper extremity 15 to lowermost exit extremity 16. The hopper is contoured so as to have no corners where dough might accumulate as a stagnant zone. Exit extremity 16 is equipped with an outwardly directed flange 17 which permits sealed joinder to advancing assembly 11.

Advancing assembly 11 is comprised in part of receiver block 19 of generally rectangular configuration bounded by flat upper and lower surfaces 20 and 21, respectively, flat front and rear surfaces 22 and 23, respectively, and opposed side surfaces 24. First and second circular cylindrical bores 25 and 26, respectively, extend in parallel disposition between said front and rear surfaces.

A coupling block 28 is removably associated with front surface 22 by bolts 29, and has a passage 30 configured to establish continuity between the front extremities of both bores. A receiving port 31 penetrates upper surface 20 and establishes communication between exit extremity 16 of the hopper and first bore 25. An auger 32 is housed within said first bore, and a mixer or "developer" unit 36 is disposed within said second bore. An exit port 41 extends between the rear extremity of the second bore and lower surface 21. Receiver block 19 and coupling block 28 are preferably fabricated of engineering grade plastic having a low coefficient of surface friction. Suitable plastics include ultra-high molecular weight polyolefin, polyacetal, polyester, polyamide, and other moldable plastics having equivalent properties.

The auger and developer are adapted to rotate in opposite directions, driven by motors 45 and 46, respectively. A separate inverter electrical speed controller 48 is associated with each motor 46 and 45. Inverter 48, of commonly known construction, is designed to receive a control signal which is utilized to control the voltage and frequency of current which powers the respective motor. A suitable inverter controller is the Movitrac model G-2 made by the Toshiba Company. Both motors may be identical, having a horsepower rating in the range of 3 to 10 HP. The auger is typically rotated at speeds in the range of 50–350 RPM. The developer is typically rotated at speeds in the range of 50–300 RPM. A vacuum exhaust port may be associated with advancing assembly 11 for the purpose of removing entrapped air from the dough. The entire advancing assembly may be constructed so that it may be pivoted upward about pivot rod 49 attached to frame 42 in parallel relationship to end surface 24 adjacent motor 45. Pivoted lifting of the advancing assembly facilitates cleaning and repair. Suitable means may be provided to secure the head assembly in its upper, cleaning position, and in its lowermost, functional position.

Transition housing 12 is disposed below lower surface 21 of said head assembly and configured to establish pressure-tight connection with exit port 41. The front surface 51 of housing 12 secures a pressure indicating device 52 which senses and indicates the hydraulic pressure of the dough within housing 12. An electronic pressure-sensing transducer 75 inserted through rear surface 76 of housing 12 produces an electrical control signal which is fed to inverter 48. By virtue of such arrangement, the speed of auger 32 is controlled. Because the route taken by the dough within the apparatus is pressure-tight, increased rotational speed of the auger produces increased pressure on the dough at transducer 75. In general, the configuration of the apparatus and its operating parameters are such that a constant pressure in the range of 15–28 psig is maintained at transducer 75.

A rotary positive displacement metering pump 13 is joined in a pressure-tight manner to the underside of housing 12, and receives dough therefrom. A suitable metering pump is Model 34 made by the Waukesha Company of Delavan, Wisc. Said pump is driven by inverter controlled variable speed motor 69, acting through a right angle coupling 70, and is characterized in having two dual lobe intersecting rotors 54. A face plate 57 held by bolts 58 can be removed to facilitate removal of the rotors and cleaning of the interior of the pump.

A horizontally disposed distribution manifold 55 is positioned below said pump and coupled thereto in pressure-tight but removable joinder by means of threaded fitting 73.

A plurality of parallel extrusion conduits 56 are downwardly directed from said manifold. Said distribution manifold and extrusion conduits 56 may be fashioned from a single block 79 of engineering grade plastic. Each conduit contains a pressure drop regulator assembly 59 comprising a control stem 64 which extends upwardly through manifold 55 to the top of block 79 where it is threadably secured at a desired elevation by means of threaded control knob 71.

The lowermost extremity of each conduit is equipped with downwardly directed nozzle means 65, as best shown in FIGS. 3–6, comprised of sidewall 80 surroundingly defining internal channel 81, and extending upon center axis 90 between upper rim extremity 82 and lower constriction surface 83 having a downwardly directed extrusion orifice 93 centered therein. The perimeters of said orifice and rim extremity are planar, parallel and orthogonal to axis 90. The perimeter of orifice 93 is of oval shape, having a center line of symmetry 86 parallel to manifold 55, and bounded by two long straight parallel edges 87 and opposed short edges 88 that are rounded convexly outwardly. The length of orifice 93 may be defined as the distance between said short edges, and its width may be defined as the distance between said long edges. The ratio of the length to width of said orifice should preferably be in the range of 4/1 to 2/1. In other embodiments, the perimeter of said orifice may have ellipsoidal or rectangular features.

Sidewall 80 is preferably of circular cylindrical configuration and adapted to communicate with extrusion conduit 56. The cross-sectional area of orifice 93 is smaller than the cross-sectional area of upper rim 82. Such effect causes a velocity acceleration of the dough immediately adjacent the nozzle, and has been found to be important in achieving a cleaner release of the dough from the nozzle. The preferred ratio of the area of upper rim 82 to the area of orifice 93 is in the range of 4/1 to 2/1. Channel 81 is continuously convergent as it proceeds from upper rim 82 to orifice 93. Accordingly, there is no stagnant zone where dough may reside. Sidewall 80 may also be equipped with recessed annular grooves 95 which secure O-rings that enable nozzle means 65 to be sealably inserted within conduits 56. A detent hole 96 may also be incorporated into sidewall 80 for the purpose of holding said nozzle means within a conduit 56 in a properly aligned and releasable manner.

Constriction surface 83 is tapered downwardly and inwardly from sidewall 80 to the long edges 87 of said orifice. The angle of said taper, shown in FIG. 5 as angle A, is preferably between 4 and 8 degrees. Angle A is measured between the tapered portion of said constriction surface, and the plane of said orifice, said angle being taken in a plane that includes axis 90.

Figure 5:
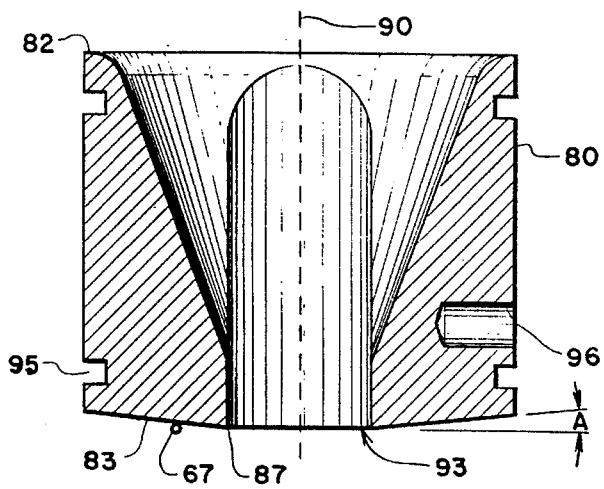
FIG. 5 is a sectional view taken upon the line 5—5 of FIG. 3.
Figure 6:
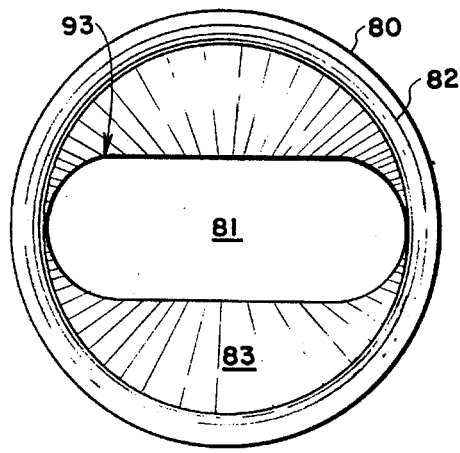
FIG. 6 is a top view of the nozzle component of FIG. 4.

A taut cutting wire 67 is mounted upon opposed support posts 78 that are synchronously moved by activating means 91 comprised of a suitable motor and associated mechanical transmission components. Wire 67 may have a thickness in the range of 1.2 to 1.5 mm., and is disposed in parallel relationship to line of symmetry 86. Said wire is caused to pass back and forth across downwardly directed orifice 93 in a substantially horizontal plane in sliding contact with the tapered constriction surface contiguous to said orifice. The wire is caused to override the orifice, as shown in FIG. 5, by 1 to 2 millimeters, which displaces the wire upwardly along the constriction surface by about 1 millimeter. The rate of said reciprocating movement is controllable by said activating means 91 within a range of 100 to 150 passes per minute or 50 to 75 cycles per minute. It is to be noted that the wire, in traversing said orifice, cuts the emergent dough in both directions of movement of the wire. This is in contrast to most prior techniques of dough cutting. Because of such dual mode of cutting, the linear rate of movement of the wire may be diminished over prior art rates of knife blade travel. Such diminished rate of linear movement, in the range of 0.3 to 0.6 feet/second, has been found to cause less flinging of pieces of dough.

The sequentially severed pieces of dough fall onto a moving belt 68 of conventional design, which carries the pieces of dough to further downstream processing prior to baking. The aforementioned specialized configuration of nozzle and associated cutting wire reduces dwell time during cutting, thereby enhancing weight uniformity and producing more accurate positioning of the pieces of dough upon the belt. Positioning of the pieces is very important in order to assure that the pieces are timed accurately for handling by downstream processing equipment. Otherwise, the pieces would jam the equipment and stop the process.

By virtue of the aforesaid specialized features of the cutting means of this invention, especially in association with a constant-pressure dough handling apparatus described hereinabove, the resultant pieces of dough exhibit remarkably accurate scaling of below 1% deviation from target weight.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. Cut-off apparatus for a dough-handling machine comprising:
    a) nozzle means comprising a sidewall surroundingly defining an internal channel and extending upon a center axis between an upper rim extremity and a lower constriction surface having a downwardly directed extrusion orifice centered therein, said orifice having a perimeter configuration that is oblong about a line of elongation, said constriction surface being tapered at least in portion downwardly and inwardly from said side wall to said orifice,
    b) a taut cutting wire aligned in a direction parallel to said line of elongation and configured to move in a reciprocating manner across said orifice in a path transverse to said line of elongation and in sliding contact with the tapered portion of said constriction surface, and
    c) means for moving said wire in said reciprocating manner.

2. The apparatus of claim 1 wherein said rim extremity has a perimeter configuration that is planar and parallel to the perimeter of said extrusion orifice.

3. The apparatus of claim 2 wherein the perimeters of both said rim extremity and extrusion orifice are in planes that are orthogonally disposed to said center axis.

4. The apparatus of claim 1 wherein said line of elongation is a line of symmetry, and said oblong configuration is an oval shape defined by two long straight parallel edges and opposed short edges.

5. The apparatus of claim 4 wherein said short edges are rounded convexly outwardly with respect to said orifice.

6. The apparatus of claim 1 wherein the angle of convergence of said tapered portion is between 4 and 8 degrees.

7. The apparatus of claim 5 wherein the ratio of the length to width of said oval shape is between 4/1 and 2/1.

8. The apparatus of claim 2 wherein the ratio of the area of the perimeter of said upper rim to the area of the perimeter of said extrusion orifice is in the range of 4/1 to 2/1.

9. The apparatus of claim 1 wherein said internal channel is continuously convergent as it proceeds from said upper rim to said extrusion orifice.

10. A process for producing successive pieces of dough of uniform weight comprising:
    a) advancing dough through a dough treating and dispersing apparatus equipped with a nozzle having a downwardly directed extrusion orifice having a perimeter configuration that is oblong about a line of elongation, and a taut cutting wire aligned in a direction parallel to said line of elongation and mounted to move in a reciprocating manner across said orifice in sliding contact therewith and in a path transverse to said line of elongation, and
    b) moving said taut cutting wire across said orifice at a rate of between 100 and 150 times per minute, the linear rate of movement of said wire being between 0.3 and 0.6 feet/second to produce successive pieces of dough of uniform weight.

\* \* \* \* \*